(12) United States Patent
Valenzuela et al.

(10) Patent No.: US 7,093,764 B1
(45) Date of Patent: Aug. 22, 2006

(54) INTEGRATED SIM HOLDER WITH BACKCASE AND ROTATING DOOR

(75) Inventors: Tony Valenzuela, Everett, WA (US); Chris Kratle, San Jose, CA (US); Troy Hulick, Saratoga, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 09/839,893

(22) Filed: Apr. 20, 2001

(51) Int. Cl.
*G06K 7/00* (2006.01)

(52) U.S. Cl. .................. 235/486; 235/492; 439/326
(58) Field of Classification Search ............. 235/492, 235/486, 483, 485, 479, 482, 441; 439/331, 439/326
See application file for complete search history.

(56) References Cited

U.S. PATENT DOCUMENTS

| | | | | |
|---|---|---|---|---|
| 5,353,328 A | | 10/1994 | Jokimies .................. 379/58 |
| 5,436,969 A | * | 7/1995 | Kobayashi ............ 379/433.09 |
| 5,603,629 A | * | 2/1997 | DeFrasne et al. ........... 439/331 |
| 5,699,406 A | * | 12/1997 | Liikanen et al. ............ 455/558 |
| 5,748,720 A | | 5/1998 | Loder ........................ 379/144 |
| 5,790,659 A | | 8/1998 | Strand ....................... 379/433 |
| 5,813,878 A | * | 9/1998 | Kuwata et al. ............. 439/326 |
| 5,815,570 A | * | 9/1998 | Hannon et al. ........ 379/433.09 |
| 5,883,786 A | | 3/1999 | Nixon ........................ 361/737 |
| 5,894,597 A | * | 4/1999 | Schwartz et al. ........... 235/441 |
| 5,901,049 A | | 5/1999 | Schmidt ..................... 361/787 |
| 5,933,328 A | * | 8/1999 | Wallace et al. ............. 439/326 |
| 5,969,331 A | | 10/1999 | Hoolhorst .................. 235/486 |
| 5,971,280 A | | 10/1999 | Hoolhorst .................. 235/486 |
| 5,979,771 A | | 11/1999 | Adams ...................... 235/486 |
| 5,984,707 A | * | 11/1999 | Kuwata ...................... 439/326 |
| 6,006,987 A | | 12/1999 | Hoolhorst .................. 235/375 |
| 6,018,669 A | | 1/2000 | Stoegmueller ............. 455/558 |
| 6,021,945 A | | 2/2000 | Hoolhorst .................. 235/441 |
| 6,047,070 A | | 4/2000 | Raaf .......................... 380/270 |
| 6,050,492 A | | 4/2000 | Hoolhorst .................. 235/475 |
| 6,106,317 A | * | 8/2000 | Michaelis et al. .......... 439/326 |
| 6,174,188 B1 | * | 1/2001 | Martucci .................... 439/326 |
| 6,175,505 B1 | * | 1/2001 | Cheng et al. ............... 361/752 |
| 6,179,649 B1 | * | 1/2001 | An ............................. 439/500 |
| 6,193,557 B1 | * | 2/2001 | Luvini et al. ............... 439/630 |
| 6,210,193 B1 | * | 4/2001 | Ito et al. .................... 439/326 |
| 6,220,882 B1 | * | 4/2001 | Simmel et al. ............. 439/326 |
| 6,226,189 B1 | * | 5/2001 | Haffenden et al. .......... 361/814 |

(Continued)

FOREIGN PATENT DOCUMENTS

DE 4008655 A1 * 8/1991

(Continued)

*Primary Examiner*—Uyen-Chau N Le

(57) ABSTRACT

An apparatus for holding a SIM (subscriber identification module) card for an electronic device. The electronic device is implemented using integrated circuits on a PCB (printed circuit board) contained within a device housing. A SIM connector is mounted on the PCB and is configured to electrically connect a SIM card to the PCB when the SIM card is engaged with the SIM connector. The SIM card is releasably held in position by a SIM card door. The SIM card door is configured to move the SIM card into engagement with the SIM connector when in a closed position. The SIM card door can be configured to slidably accept the SIM card into a properly aligned position when the SIM card door is in the open position. The SIM card door is releasably engageable with the housing and is rotatably attached to the housing such that the SIM card door swings into the closed position from the open position. Holding the SIM card with the SIM card door provides for a smaller SIM connector and thus a minimum amount of PCB area for mounting the SIM connector.

16 Claims, 3 Drawing Sheets

U.S. PATENT DOCUMENTS

| | | | |
|---|---|---|---|
| 6,234,810 B1 * | 5/2001 | Schnell et al. | 439/76.1 |
| 6,424,118 B1 * | 7/2002 | Tu | 320/115 |
| 6,450,408 B1 * | 9/2002 | Shiue | 235/492 |
| 6,468,101 B1 * | 10/2002 | Suzuki | 439/326 |
| 6,547,138 B1 * | 4/2003 | Braun et al. | 235/441 |
| 6,724,618 B1 * | 4/2004 | Jenkins et al. | 361/684 |

FOREIGN PATENT DOCUMENTS

| | | | |
|---|---|---|---|
| EP | 0475210 B1 | | 8/1991 |
| EP | 0503434 B1 | | 3/1992 |
| EP | 0564105 A2 | | 6/1993 |
| EP | 0989683 A2 | | 9/1999 |
| EP | 967771 A2 | * | 12/1999 |
| EP | 1004979 A | * | 5/2000 |
| GB | 2842603 A1 | | 9/1978 |
| GB | 4419073 A1 | | 5/1994 |
| GB | 19611237 A1 | | 3/1996 |
| GB | 19703007 A1 | | 1/1997 |
| GB | 19834436 A1 | | 7/1998 |
| GB | WO99/44378 | | 1/1999 |
| GB | 2327791 A | | 2/1999 |
| GB | 2327792 A | | 2/1999 |
| GB | 2338811 A | | 12/1999 |
| JP | 08329203 A | * | 12/1996 |
| JP | 2002101170 A | * | 4/2002 |
| WO | WO 99/64976 | | 12/1999 |

* cited by examiner

INTEGRATED SIM HOLDER WITH BACKCASE AND ROTATING DOOR

TECHNICAL FIELD

The present invention relates to a system and method by which computing devices may more easily utilize SIM (subscriber identification module) card mechanisms. In particular, the present invention relates to a system and method for implementing a secure SIM card confinement mechanism with minimal mounting area and convenient access.

BACKGROUND ART

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used to implement various Personal Information Device (PID) applications such as an address book, a daily organizer, and electronic notepads.

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,0398; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, expense reports, to do lists, or games. PIDs also often include substantial electronic memory for storing such applications as well as data entered by the user. Due to their substantial variety of applications and uses, personal information devices are becoming increasingly widely used.

The use of subscriber identification module (SIM) cards in portable hand-held devices, such as PIDs or cellular phones, is a requirement for any GSM enabled device. In a GSM cellular phone, the SIM card is typically used for billing and security. The SIM card may also be used for storing operational data such as a phone book, small programs, and/or quick dial numbers. With a SIM card, a user can operate various phones and still retain, for example, a single billable account. As PIDs incorporate GSM radio capabilities, they will assume the roles and applications of cellular telephones. These same capabilities (e.g., phone book, billing information, etc.) are provided by incorporating SIM cards into the PIDs. The SIM card thus eliminates the need to reprogram information (e.g., phone numbers, addresses, etc.) and enables a single billable customer account for multiple SIM card enabled devices.

In prior art mechanisms, the SIM card is typically mounted in the housing of the hand-held device and secured with a latching assembly. Various latching assemblies are known, however, they typically contain two or more distinct components. When the SIM card is located in a cosmetic region of the phone, a door is typically used to access the SIM card. A separate latching mechanism is integrated into the SIM connector to securely hold the SIM card. In this arrangement, the user must open the door and then unlatch the card by sliding a locking mechanism and/or rotating the lock to gain access to the SIM card. This manipulation can be very difficult due to the small parts and intricate areas involved. These integrated SIM latching connectors also require excessive amounts of PCB (printed circuit board) space, which also makes them a less attractive solution.

Other prior art mechanisms implement a SIM connector snapped into the rear housing of a hand-held device, or fixed directly to the device's printed circuit board (PCB) with a SIM card door for preventing the SIM card from falling out of the device. For example, when the door is open, the SIM card can be removed by simply turning the phone upside-down and allowing the SIM card to fall out. In this arrangement, a confining apparatus must be included to properly confine the SIM card in place. This confining "well" adds size and area to the SIM connector (e.g., consuming excessive amounts of PCB area), and allows the SIM card to simply fall out if the hand-held device is inadvertently turned upside-down with the door open.

Thus, what is required is a solution that eliminates the requirement for a separate latching mechanism integrated into a SIM connector. The required solution should facilitate easy operation by a user. The required solution should require a minimum amount of PCB (printed circuit board) area for mounting a SIM connector. The required solution should securely hold a SIM card when in an open position to prevent inadvertently loosing the SIM card. The required solution should be intuitive and compatible with typical hand-held device cases with which users have become familiar. The present invention provides a novel solution to the above requirements.

SUMMARY OF THE INVENTION

The present invention provides a solution that eliminates the requirement for a separate latching mechanism integrated into a SIM connector. The present invention requires a minimum amount of PCB area for mounting a SIM connector and securely holds a SIM card when in an open position to prevent inadvertently loosing the SIM card. The present invention facilitates the easy operation by a user and is compatible with typical hand-held device cases with which users have become familiar.

In one embodiment, the present invention is implemented as an integrated back case and rotating door SIM card holder apparatus. The apparatus functions by holding a SIM (subscriber identification module) card for the electronic device. The electronic device is implemented using integrated circuits on a PCB (printed circuit board) contained within a device housing. A SIM connector is mounted on the PCB and is configured to electrically connect the SIM card to the PCB when the SIM card is engaged with the SIM connector. The SIM card is releasably held in position by a SIM card door. The SIM card door is configured to move the SIM card into engagement with the SIM connector when in a closed position. The SIM card door can be configured to slidably accept the SIM card into a properly aligned position when the SIM card door is in the open position. The SIM card door also includes features that force the user to orient the SIM card properly in the SIM card door to ensure proper engagement with the SIM connector when closed. The SIM card door is releasably engageable with the back case of the housing and is rotatably attached to the back case such that the SIM card door swings into the closed position from the open position.

Holding the SIM card with the SIM card door provides for a smaller SIM connector and thus a minimum amount of PCB area for mounting the SIM connector. Additionally, the SIM card door securely holds a SIM card when in an open position to prevent inadvertently loosing the SIM card. Manipulation (e.g., inserting, removing) of the SIM card and opening and closing of the SIM card door is intuitive to the user.

BRIEF DESCRIPTION OF THE DRAWINGS

The present invention is illustrated by way of example and not by way of limitation in the Figures of the accompanying drawings, in which like reference numerals refer to similar elements, and in which.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

The present invention comprises an integrated back case and rotating door SIM card holder apparatus. The apparatus of the present invention provides a solution that eliminates the requirement for a separate latching mechanism integrated into a SIM connector. The present invention requires a minimum amount of PCB area for mounting a SIM connector and securely holds a SIM card when in an open position to prevent inadvertently loosing the SIM card. The present invention facilitates the easy operation by a user and is compatible with typical hand-held device cases with which users have become familiar. The present invention and its benefits are further described below.

Figure 1:
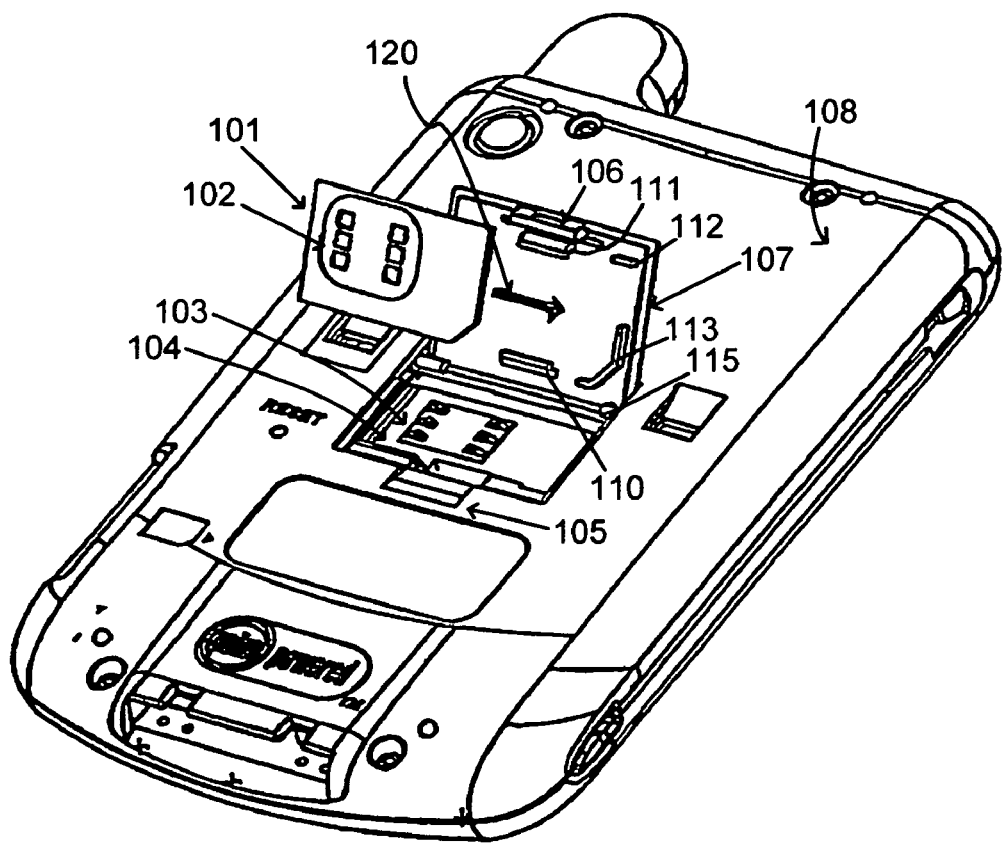
FIG. 1 shows a diagram of a back case of a housing of a personal information device including a SIM card door apparatus in accordance with one embodiment of the present invention.

FIG. 1 shows a diagram of the back case 108 of a PID (personal information device) 100 in accordance with one embodiment of the present invention. The present invention comprises a back case 108 having an integrated rotating door SIM card holder apparatus, SIM card door 107. Although the present invention is described in the context of a PID, it should be noted that embodiments of the present invention are suited for use in other types of hand-held electronic devices (cellular telephones, pagers, etc.).

As depicted in FIG. 1, PID 100 is enclosed a case housing, of which back case 108 (e.g., the back of PIC 100) is shown.

As depicted in FIG. 1, SIM card door 107 is in an open position. SIM card door 107 is configured to accept SIM card 101, as SIM card 101 is slid into position from left to right as indicated by arrow 120. SIM card door 107 is configured to hold the SIM card 101 in the proper position using the integral holders 110, 111, 112, and 113. Holders 110–113 thus releasably confine and hold SIM card 101 in the proper position.

Once the SIM card 101 is slid into position (e.g., slid from left to right into holders 110–113), the SIM card door 107 can be rotated into the closed position, where the electrical contacts 102 of SIM card 101 are brought into electrical contact with a SIM connector 103. SIM connector 103 functions by communicatively coupling electrical contacts 102 of the SIM card 101 with other integrated circuit devices of a PCB (printed circuit board) 104. SIM card door 107 rotates/swings between the open position and the closed position about a pivot 115. SIM card door 107 uses a latch 106 and a latch receiver 105 to securely latch into the closed position, such that SIM card door 107 is releasably engageable with back case 108. By latching into the closed position, SIM card door 107 moves SIM card 101 (e.g., contacts 102) into electrical connection with the SIM card connector 103. The latch 106 is integral with the SIM card door 107.

Referring still to FIG. 1, it should be noted that holding the SIM card 101 with the SIM card door 107 provides for a smaller SIM connector 103 in comparison to the prior art. In accordance with the present invention, SIM connector 103 is only required to electrically connect the electrical contacts 102 of SIM card 101 with PCB 104. The task of confining and holding SIM card 101 in the proper position is performed by SIM card door 107. SIM connector 103 need only establish a reliable electrical connection. Thus, SIM connector 103 can be optimized to use a minimum amount of PCB area. For example, as depicted in FIG. 1, SIM connector 103 is much smaller the SIM card 101, and thus requires a very small mounting area on PCB 104. The very small mounting area reduces costs associated with fabricating SIM connector 103, and more importantly, conserves valuable surface area of the PCB 104 itself.

Additionally, it should be noted that the SIM card door 107 securely holds SIM card 101 when in both the open position and in the closed position. Thus, SIM card door 107 prevents inadvertently loosing the SIM card 101 when SIM card door 107 is open. Manipulation (e.g., inserting, removing) of the SIM card 101 and opening and closing of the SIM card door 107 requires a positive action by the user (e.g., SIM card 101 will not fall out if the electronic device 100 is turned over). The operation of SIM card door 107 is intuitive to the user. Also, SIM card door 107 facilitates easy operation by a user and is compatible with typical hand-held device cases and housings with which users have become familiar.

Figure 2:
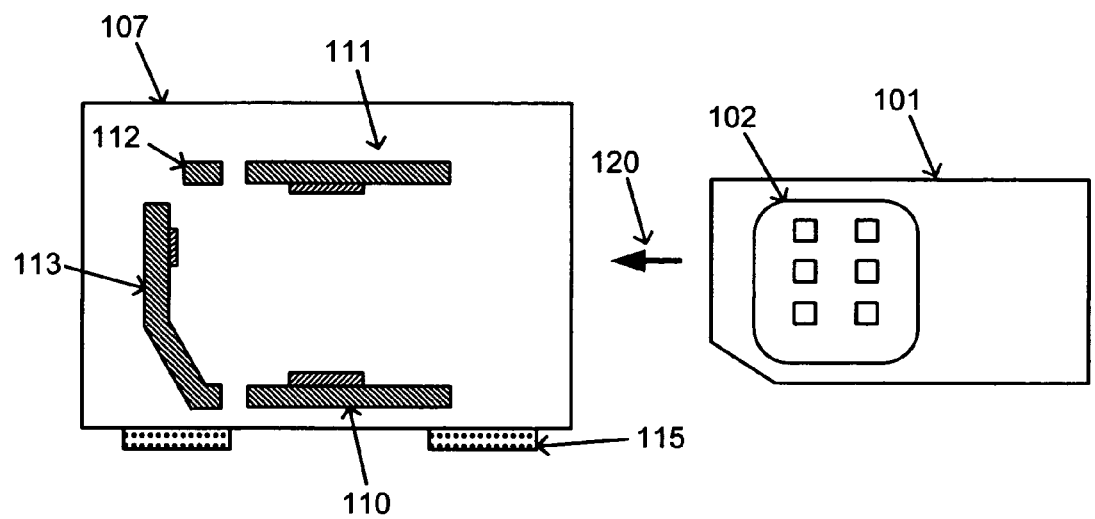
FIG. 2 shows a close-up view of a SIM card door and a SIM card prior to the SIM card being inserted into the proper position.

FIG. 2 shows a close-up view of SIM card door 107 and SIM card 101. As described above, SIM card door 107 includes holders 110–113 which receive SIM card 101 as it is slid into place by the user, as indicated by arrow 120. FIG. 2 shows SIM card door 107 prior to receiving SIM card 101.

Figure 3:
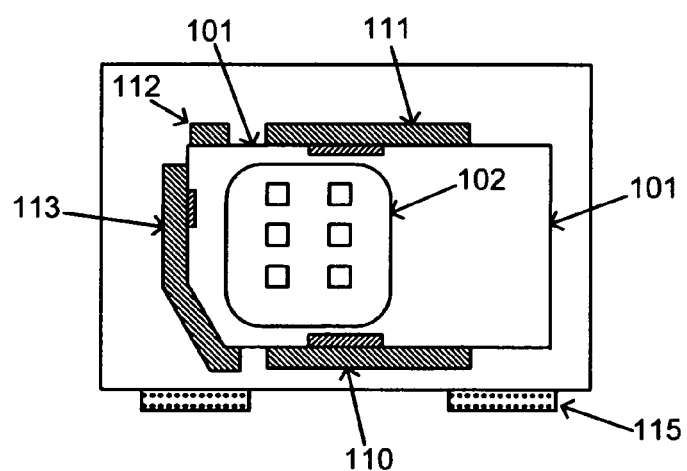
FIG. 3 shows a close-up view of a SIM card door and a SIM card after the SIM card has been inserted into the proper position.

FIG. 3 shows a close-up view of SIM card door 107 and SIM card 101 after SIM card 101 has been slid into position. As described above, once in position, SIM card 101 is held in place by holders 110–113. Holders 110–113 are configured such that the electrical contacts 102 of SIM card 101 are in proper alignment, such that when SIM card door 107 is rotated into the closed position, contacts 102 will properly connect with SIM connector 103 (shown in FIG. 1).

Figure 4:
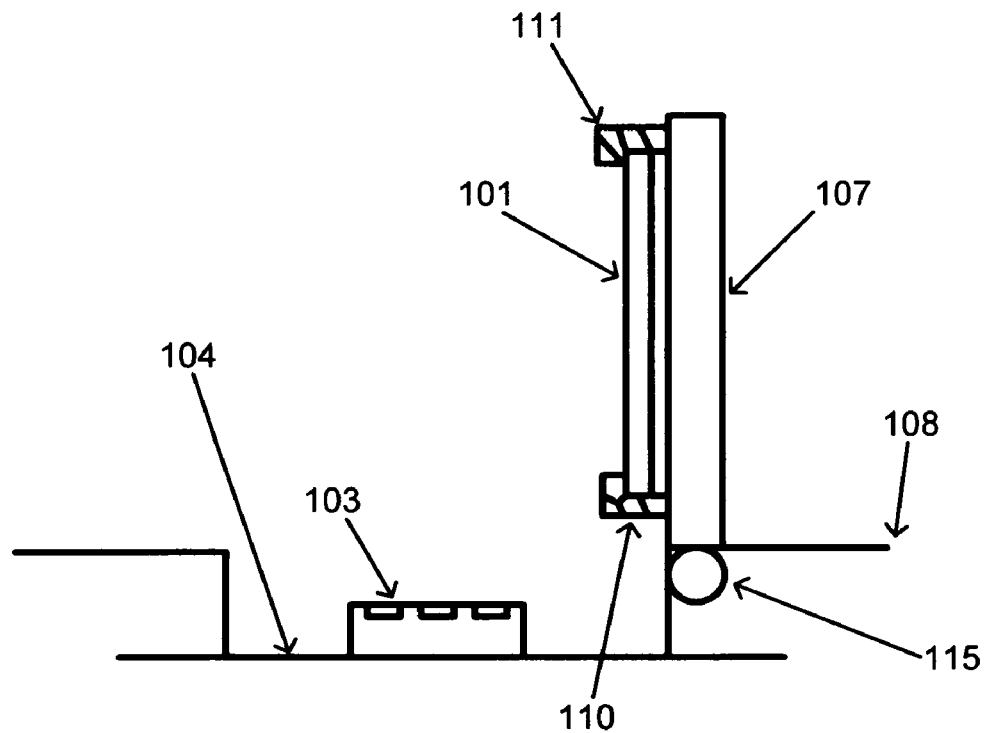
FIG. 4 shows a side close-up view of a SIM card door and a SIM card prior to the SIM card door being rotated into the post position.

FIG. 4 shows a close-up side view of SIM card door 107 and SIM card 101 after SIM card 101 has been slid into position. As depicted in FIG. 4, SIM card door 107 is in the open position. As described above, the task of confining and holding SIM card 101 in the proper position is performed by SIM card door 107. Thus, SIM connector 103 can be optimized to use a minimum amount of area of PCB 104. To close SIM card door 107, the user rotates SIM card door 107 about pivot 115, such that SIM card door 107 swings into the closed position and latches.

Thus, the present invention provides a solution that eliminates the requirement for a separate latching mechanism integrated into a SIM connector. The present invention requires a minimum amount of PCB area for mounting a SIM connector and securely holds a SIM card when in an open position to prevent inadvertently loosing the SIM card. The present invention facilitates the easy operation by a user and is compatible with typical hand-held device cases with which users have become familiar.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. An apparatus for holding a SIM (subscriber identification module) card for a personal information device, comprising:
   a SIM card;
   a PCB (printed circuit board) within a single piece back housing of the personal information device;
   a SIM connector mounted on the PCB, the SIM connector configured to electrically connect the SIM card to the PCB when the SIM card is engaged with the SIM connector, wherein the SIM connector includes a plurality of contacts and is smaller than the SIM card; and
   a SIM card door comprising a plurality of holders disposed on the surface of the SIM card door for releasably holding the SIM card in the proper position and further configured to hold the SIM card when the SIM card door is in the open position and wherein said plurality of holders and said SIM card door form a single piece door, the single piece SIM card door configured to move the SIM card into engagement with the SIM connector when in a closed position.

2. The apparatus of claim 1, wherein the SIM card door is configured to releasably hold the SIM card such that the SIM card is properly aligned with the SIM connector when the SIM card door is moved into the closed position.

3. The apparatus of claim 1, wherein the SIM card door is configured to slidably accept the SIM card into a properly aligned position when the SIM card door is in the open position.

4. The apparatus of claim 1, further comprising a front housing for combining with the back housing for containing the electronic device, wherein the SIM card door is releasably engageable with the back housing.

5. The apparatus of claim 4 wherein the SIM card door is rotatably attached to the back housing such that the SIM card door swings into the closed position from the open position.

6. A SIM door apparatus for holding a SIM (subscriber identification module) card for a personal information device, comprising:
   a PCB (printed circuit board);
   a housing of the personal information device containing the PCB;
   a SIM card door rotatably attached to the housing, the SIM card door comprising a plurality of holders disposed on the surface of the SIM card door wherein said plurality of holders and said SIM card door form a single piece SIM card door and configured to hold the SIM card in the proper position and further configured to releasably hold the SIM card when the single piece SIM card door is in the open position; and
   a SIM connector mounted on the PCB, the SIM connector configured to electrically connect a SIM card to the PCB when the SIM card door swings the SIM card into engagement with the SIM connector by rotating into a closed position, wherein the SIM connector includes a plurality of contacts and is smaller than the SIM card and is smaller than the single piece SIM card door.

7. The SIM card door apparatus of claim 6, wherein the SIM card door is configured to releasably hold the SIM card such that the SIM card is properly aligned with the SIM connector when the SIM card door is moved into the closed position.

8. The SIM card door apparatus of claim 6 wherein the SIM card door is configured to slidably accept the SIM card into a properly aligned position when the SIM card door is in the open position.

9. The SIM card door apparatus of claim 6 wherein the SIM card door is releasably engageable with the housing.

10. The SIM card door apparatus of claim 9 wherein the SIM card door includes a latch in order to maintain the closed position.

11. The SIM card door apparatus of claim 6 wherein the SIM card door is rotatably attached to a back case of the housing.

12. A personal information device, comprising:
   a PCB (printed circuit board);
   a personal information device housing containing the PCB;
   a SIM card door rotatably attached to the housing, the SIM card door comprising a plurality of holders disposed on the surface of the SIM card door wherein said plurality of holders and said SIM card door form a single piece SIM card door, the single piece SIM card door configured to releasably hold the SIM card; and
   a SIM connector mounted on a PCB included in the personal information device and connector configured to electrically connect a SIM card to the PCB when the single piece SIM card door swings the SIM card into engagement with the SIM connector by rotating into a close position, wherein the SIM connector includes a plurality of contacts and is smaller than the SIM card and is smaller than the single piece SIM card door;
   wherein the holders are configured to releasably hold the SIM card in the proper position such that the SIM card is properly aligned with the SIM connector when the single piece SIM card door is moved into the closed position;

wherein the holders are configured to slidably accept and hold the SIM card into a properly aligned position when the single piece SIM card door is in the open position.

13. The SIM card door apparatus of claim 12 wherein the SIM card door is releasably engageable with the housing.

14. The SIM card door apparatus of claim 13 wherein the SIM card door includes a latch in order to maintain the closed position.

15. The SIM card door apparatus of claim 14, further comprising a plurality of holders disposed on the surface of the SIM card door, the holders configured to hold the SIM card in the proper position.

16. The SIM card door apparatus of claim 15 wherein the holders are configured to hold the SIM card when the SIM card door is in the open position.

* * * * *